Sept. 10, 1963 K. PITTS ETAL 3,103,630
CENTER ARMREST WITH DETACHABLE RADIO
Filed Dec. 30, 1958 5 Sheets-Sheet 4

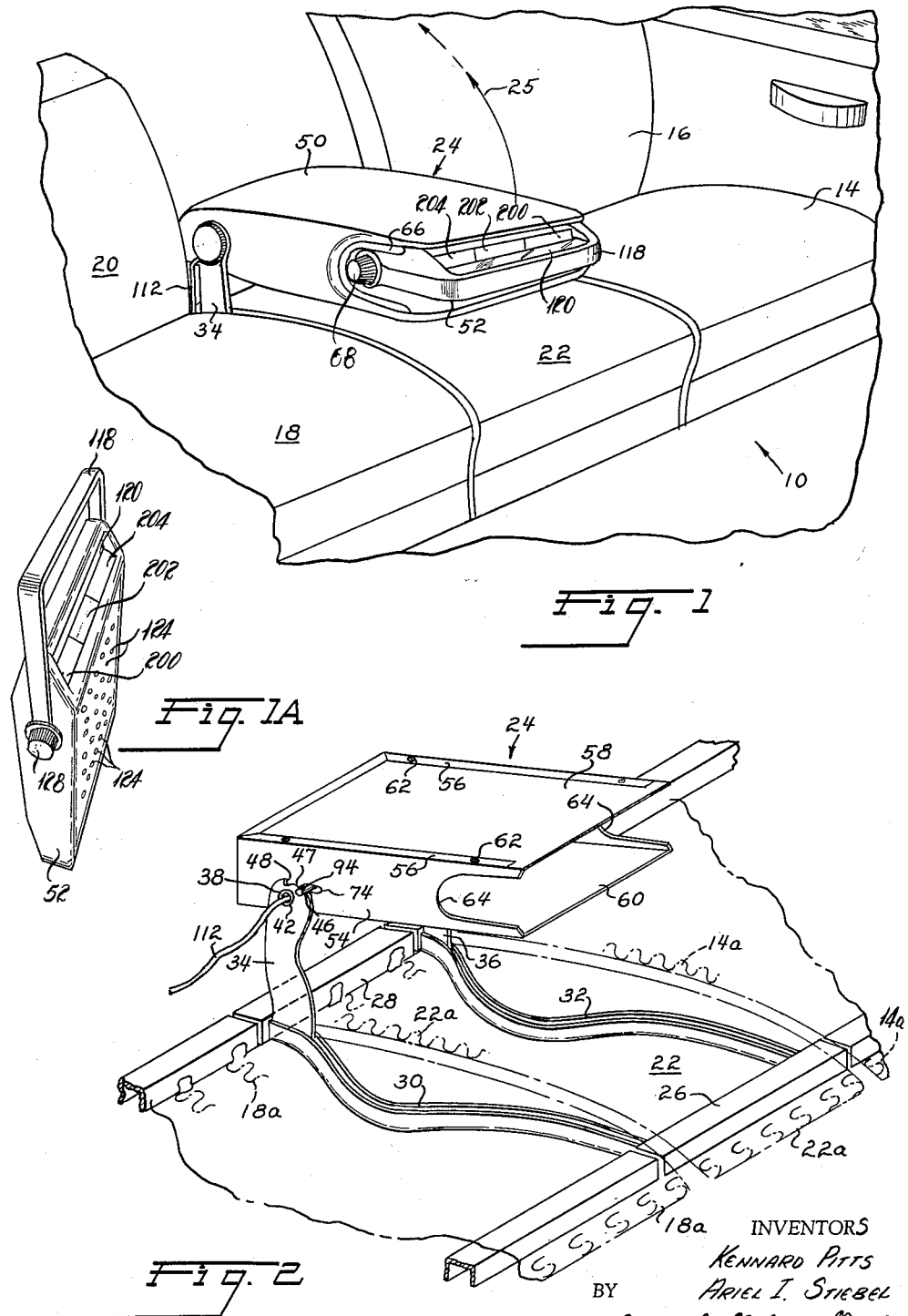

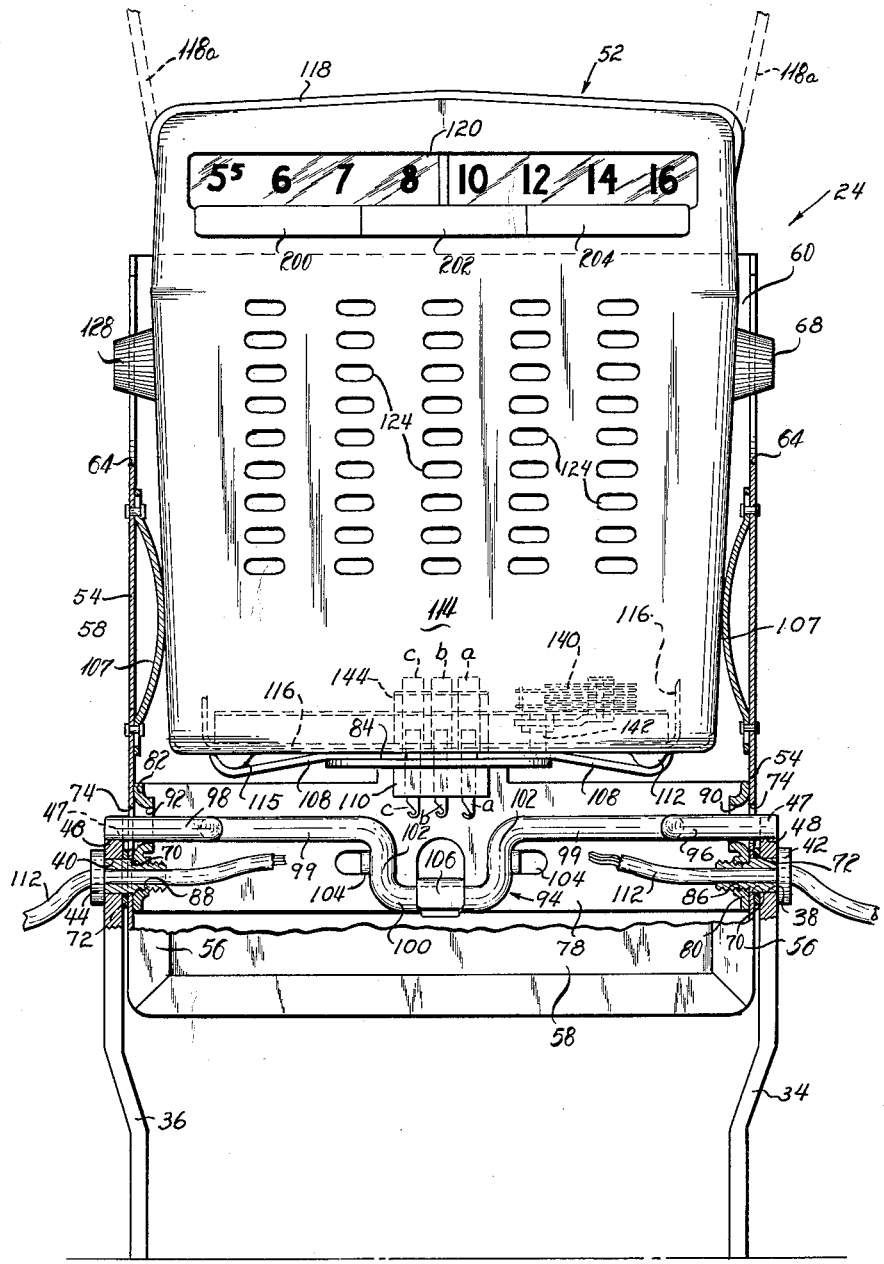

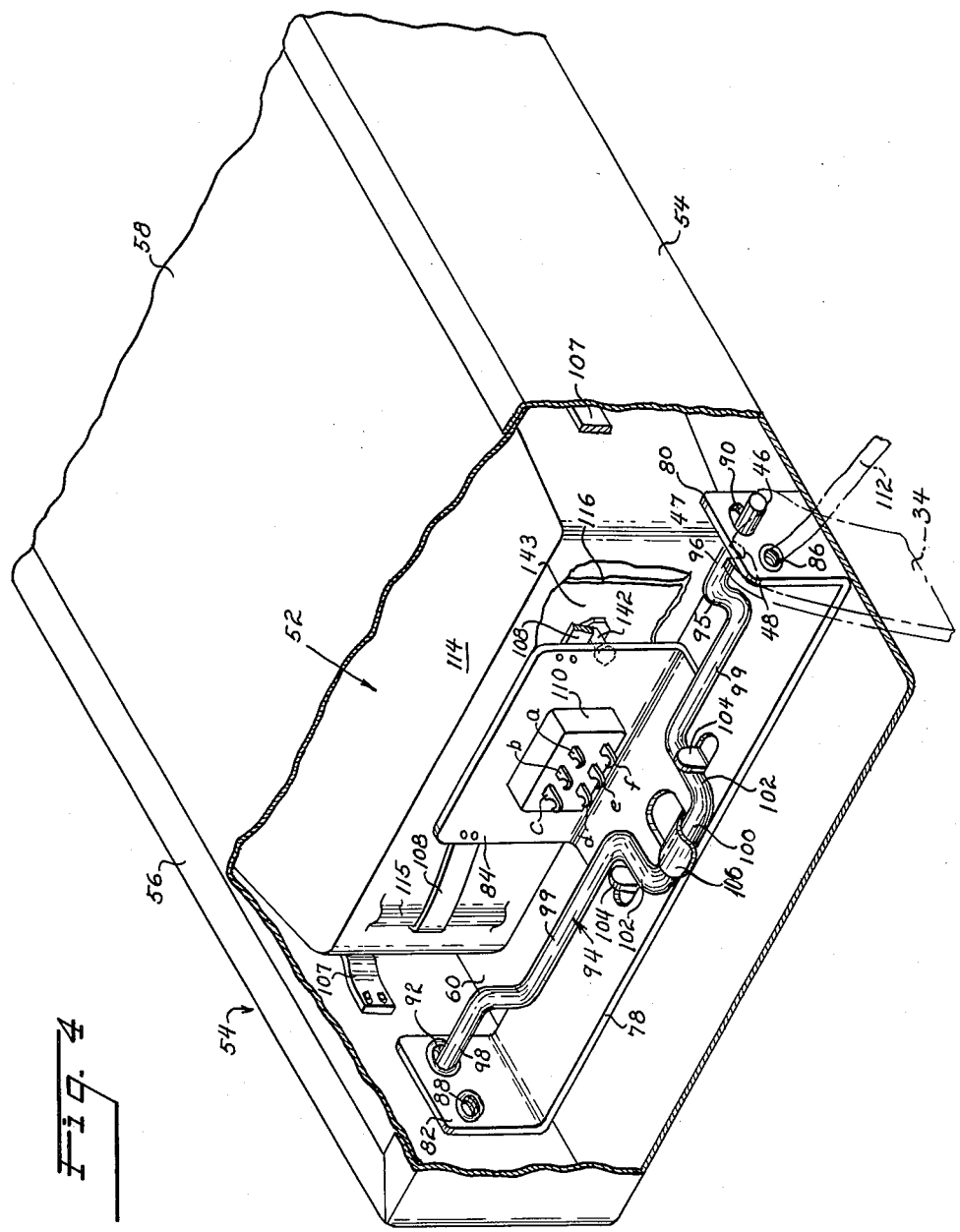

INVENTORS
KENNARD PITTS
ARIEL I. STIEBEL
BY Strauch, Nolan & Neale
ATTORNEYS

Sept. 10, 1963 K. PITTS ETAL 3,103,630
CENTER ARMREST WITH DETACHABLE RADIO
Filed Dec. 30, 1958 5 Sheets-Sheet 5
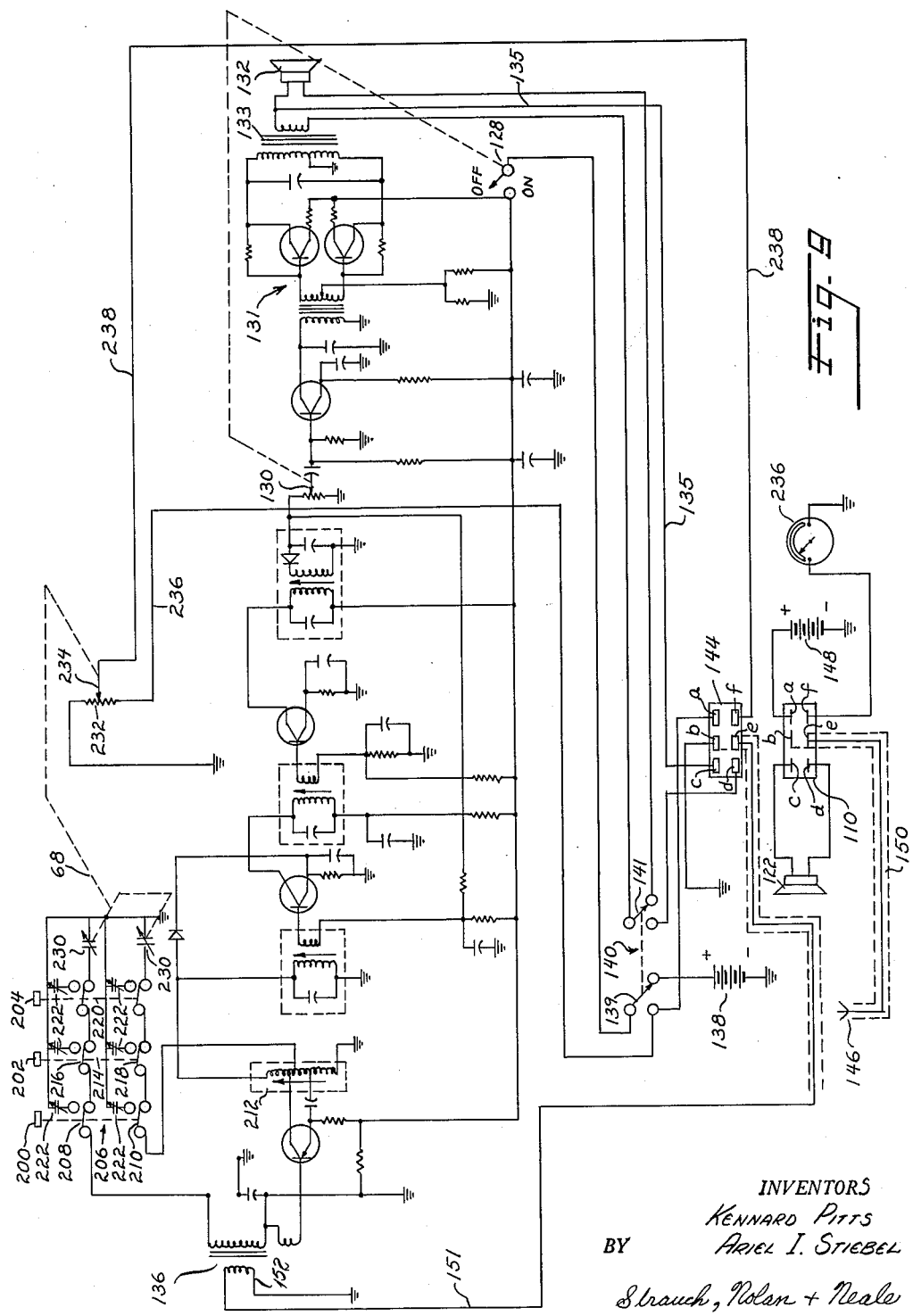
INVENTORS
KENNARD PITTS
BY ARIEL I. STIEBEL
Strauch, Nolan + Neale
ATTORNEYS United States Patent Office 3,103,630
Patented Sept. 10, 1963

3,103,630
CENTER ARMREST WITH DETACHABLE RADIO
Kennard Pitts and Ariel I. Stiebel, Detroit, Mich., assignors to Rockwell-Standard Corporation, Coraopolis, Pa., a corporation of Pennsylvania
Filed Dec. 30, 1958, Ser. No. 783,951
4 Claims. (Cl. 325—312)

This invention relates to portable radio receivers adapted to fit in the center armrest of an automobile, and more particularly to the physical construction of the armrest and of the radio to adapt the combination automobile and portable radio for operation both in the automobile utilizing the automobile power supply, speaker system and antenna, and outside the automobile utilizing the self-contained power supply, speaker system and antenna.

Several attempts have been made in the past to provide a satisfactory automobile radio receiver by mounting a portable radio receiver instead of a fixed one on the instrument panel, seat, or some other place in the automobile, the entire receiver being removable from the autmobile when so desired, of which examples are shown in United States Patents No. 2,662,975; 2,071,398 and 1,809,296. Such prior art constructions have proven unsatisfactory as portable radios, principally because they were too bulky for easy portability, or as automobile radios, because they had poor reception and in some cases were not readily accessible to be easily tuned by the driver.

To overcome engine and exterior noises developed by an operating automobile, it is essential to have an automobile radio receiver with a high amplitude audio power output which usually requires a large speaker or a speaker system containing several small speakers. To provide these desirable features in a portable radio receiver requires enlargement of a portable receiver to such an extent that the portability is severely restricted since a portable radio receiver is desirably small, light, and of a compact nature so that it may be carried around at ease.

A major object of the present invention is to provide a novel universal radio receiver which automatically switches into the fixed power and audio unit of an automobile when installed therein and, when separated therefrom, provides an attractive, compact, self-contained, and self-powered, easy-to-transport radio receiver unit.

A further object of the present invention is to provide for the installation of a portable radio receiver in an automobile in the center armrest of a front seat in such manner as to permit easy operation by either the passengers or the driver. The novel portable, self-contained radio unit of the present invention is readily removable from and insertable into a compartment in the center armrest which is of a size and shape as is convenient for a portable radio.

A still further object of the invention is to provide a novel construction such that the portable unit will automatically connect to the fixed unit when installed in the automobile front seat armrest and in this position the complete radio comprises the automobile antenna, the automobile power supply, the amplifying and detecting unit of the portable radio and the speaker system of the automobile while the power supply and speaker of the portable radio will be automatically disconnected. When the portable radio is removed from the automobile, the antenna, the power supply and speaker of the automobile are automatically disconnected and the self-contained power supply, loop antenna and speaker of the portable radio are automatically connected, thus making the portable radio a complete receiver within itself.

Still another object of the invention is to provide a novel universal radio having means to prevent theft or unauthorized removal of the portable radio from the front seat armrest in the automobile. To this end, the present invention is provided with a locking means consisting of a lock bar which extends into the portable unit when inserted into its receptacle in the armrest of the automobile and which is locked by means of a spring loaded locking striker plate. Turning the lock bar by means of a key unlocks the radio for removal.

A further object of the present invention is to provide a novel armrest construction which is provided with an accessory receiving receptacle which may be of general utility if it is not desired to use it for a portable radio.

Another object of the present invention is the provision of a portable radio receiver of the transistor type conveniently installed in the center armrest of an automobile seat and operable whether the center armrest is in its down position or turned upward to provide a back rest. Such radio, in accordance with still a further feature of the invention, is provided with a remote station indicator on the dashboard of the automobile to be readily visible to the driver of the automobile so that manual tuning of the radio may be effected by the driver without turning and focusing his eyes on the dial of the radio in the armrest.

Still a further object of the present invention is to incorporate in a portable battery operated car radio a push-button tuning device which presents a convenient means of instantaneous selecting favorite stations in addition to conventional manual tuning controls, eliminating tedious searching.

Still another object of the present invention resides in the provision of a push-button tuning device for a portable car radio, providing pretuned capacitors which are switched into the radio antenna and oscillator tank circuits and which can be tuned to any desired station of the broadcast band.

Another and more detailed object of the present invention is to provide means in a center armrest of an automobile installed portable radio by which the antenna, power supply and speaker system of the automobile are connected through hollow hinges about which the center armrest pivots.

These and other objects of the invention will become more fully apparent from the claims, and from the following description and the appended drawings in which:

FIGURE 1a is a pictorial view of the portable radio seat having in the center armrest a receptacle containing a portable radio;

FIGURE 1A is a pictorial view of the portable radio of FIGURE 1 removed from the center armrest;

FIGURE 2 shows the skeleton of a swivel seat frame in part with attached armrest casing serving as a receptacle for the portable radio;

FIGURE 3 is a plan view of the center armrest partially broken away showing the portable radio in operative position therein;

FIGURE 4 is a pictorial view of the radio mounted in the armrest with part of the armrest broken away;

FIGURE 9 is a schematic electrical diagram of a transistor type portable radio having push-button tuning with the added switch and plug-in components and remote tuning indicator scale according to the present invention.

Figure 5:
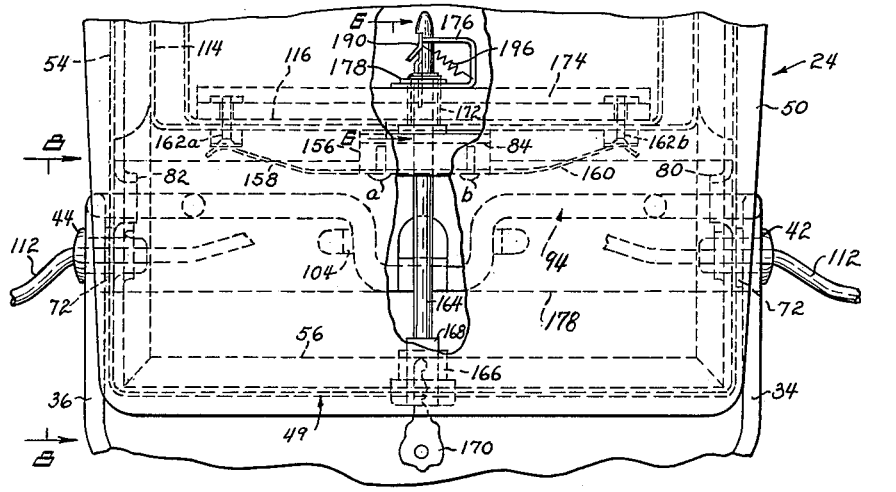
FIGURE 5 is a plan view similar to FIGURE 3 of a radio and armrest having a modified terminal block for the radio and a receptacle complete with a locking mechanism and key.

Referring now to FIGURE 1, there is illustratively shown an automobile seat which may be of any conventional type of construction. While it may be of solid construction or have a pivoting back rest as in a two-door automobile, the present invention has special utility with the swiveling type of seat, that is, a seat composed of three sections 18, 22 and 14 of which both the larger outer sections 18 and 14 are designed to swivel outwardly to ease the entry of an occupant into the automobile, while the smaller midsection 22 remains stationary.

In the embodiment illustrated in FIGURES 1 and 2, the seat generally indicated at 10 comprises a left-hand seating section 14 having a back rest 16 and a right-hand seating section 18 having a back rest 20. Inbetween both end sections 14 and 18 is a narrower stationary midsection 22 which has, instead of the usual back rest, a center armrest 24 which may be pivoted upwards (in the direction of arrow 25 in FIGURE 1) to occupy the space between adjacent back rests 16 and 20 and serve as a back rest for a third passenger when desired. It is contemplated that usually armrest 24 will be in the down position as illustrated in the drawings (FIGURES 1 and 2) for the convenience of two occupants on either side thereof.

In FIGURE 2 the frame skeleton of the intermediate seating section 22 of FIGURE 1 is illustrated in detail showing seat springs 14a, 18a, and 22a for the respective seating sections 14, 18 and 22 of FIGURE 1 secured between front seat rail 26 and rear seat rail 28. Midsection 22, to which the present invention applies, comprises two identical U-shaped flanges 30 and 32 welded respectively to front seat rail 26 and to rear seat rail 28. Welded into the rear of U-shaped flanges 30 and 32 on opposite sides of the fixed center seat portion 22 adjacent rear seat rail 28 but inside the seat frame, are two identical upstanding stanchions 34 and 36 (see also FIGURES 3 and 8) made of a relatively flat rigid metal stamping. Stanchions 34 and 36 are provided near their upper extremities with pivot holes 38 and 40 respectively to accommodate the insertion of hollow pivot screws 42 and 44 which have another purpose to be described later on besides securing center armrest 24 on stanchions 34 and 36 for pivotal movement.

In addition to pivot holes 38 and 40, each of stanchions 34 and 36 is further provided at its top edges with two spaced apart semicircular notches 46 and 48 which serve as stops for the down and up positions of the armrest as will be explained below.

Center armrest 24 essentially consists of a rectangular flat box of a suitable material such as sheet metal that is open at the front to accommodate the insertion of a portable radio 52 shown in FIGURE 1a. At final assembly the metal box is padded and upholstered, as at 50 in FIGURES 1, 5 and 8, in such manner that radio 52 inserted in the center armrest assembly 24 will not interfere with the normal functioning of the armrest. It will further be noted that even with the radio removed, the upper surface of armrest 24 is unaltered, and a storage compartment of general utility is provided.

With continued reference to FIGURE 2, armrest 24 which receives the portable radio 52, may consist of an integral U-shaped side and rear metal stamping 54 having inwardly turned flanges 56 to which a top cover plate 58 is secured as by means of sheet metal screws 62. Similar inwardly turned flanges (not shown) are provided for securing lower cover plate 60. Both sides of side stamping 54 are provided with cut-out portions having a recessed edge 64 at the front open end to accommodate the mounting of a trim flange 66 (see FIGURE 1) and to provide room for the tuning knob 68 and on-off and volume control knob 128 of radio 52 (FIGURES 1, 3 and 9).

Figure 8:
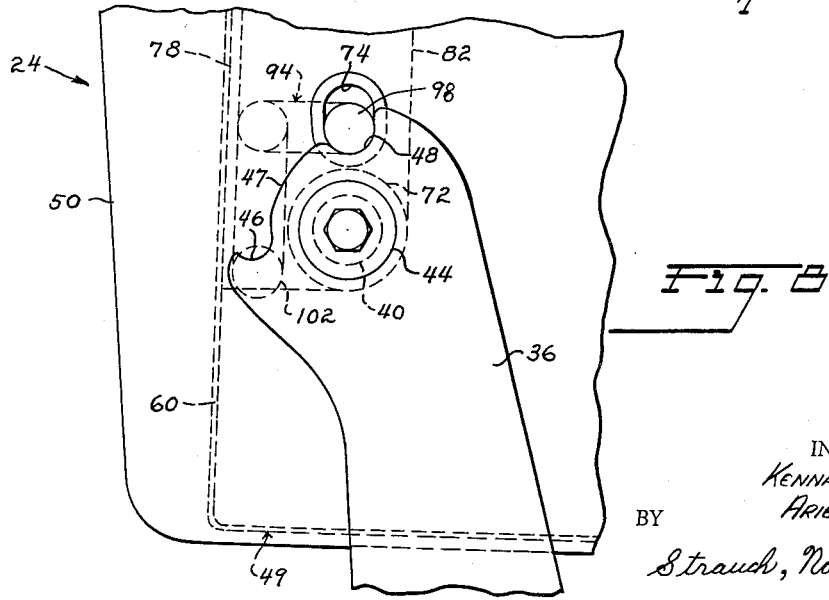
FIGURE 8 is a side view of the hinge components of the center armrest taken along line 8—8 of FIGURE 5.

With reference to FIGURES 2, 3 and 8, at the rear end of stamping 54 both sides are provided with holes 70 which are aligned with holes 40 for insertion of hollow screws 42 and 44. To prevent binding between the center armrest 24 and support arms 34 and 36, washer plates 72, preferably of nylon, are inserted between the surfaces of side stamping 54 and support arms 34 and 36 (see FIGURES 3 and 5). An additional elongated hole 74 is provided on each side of stamping 54 at a small distance from screw holes 70 to be adjacent notches 46 and 48 in support arms 34 and 36.

Inside armrest 24 near its rear closed end is a bracket 78 best shown in FIGURES 3, 4 and 8 which is suitably secured as by spot welding to the inside surface of both sides of side stamping 54 and to the lower cover plate 60. Bracket 78 has upstanding side flanges 80 and 82 abutting opposite sides of stamping 54 and a central flange 84 at right angles thereto which serves to locate the rear end of portable radio 52. Side flanges 80 and 82 are provided with internally threaded holes 86 and 88 aligned with apertures 70 in armrest 24, washers 72 and apertures 38 and 40 in support arms 34 and 36 to accommodate securing of hollow pivot screws 42 and 44 (see FIGURES 3 and 4). Side flanges 80 and 82 are also provided with elongated slots 90 and 92 aligned to match with elongated slots 74 (see also FIGURES 4 and 8) of the side stampings 54 of armrest 24.

A multiply bent tension bar 94 extends transversely across the inner rear portion of armrest 24 over bracket 78 and has aligned end sections 96 and 98 with free ends extending through elongated slots 90 and 92 of bracket 78 and elongated slots 74 of sides of stamping 54 to fit into notches 46 and 48 of support arms 34 and 36. Downwardly extending sections join with the main body portion 99 and offset midsection 100 lying along the upper surface of bracket 78. Midsection 100 of tension bar 94 is bent to extend rearwardly from transverse portions 102, abuts the top flat surface of bracket 78 and is prevented from shifting laterally by two side tab abutments 104 abutting portions 102 of tension bar 94. Tab 106 stamped from bracket 78, is bent over to overlap the top of midsection 100 to restrain this section from swinging upwards when the center armrest assembly 24 is being pivoted up or down.

Tension bar 94 holds armrest 24 securely in either a horizontal position with free ends 96 and 98 in slots 46 of support arms 34 and 36 to serve as an armrest as shown in FIGURES 1, 2 and 4 or in a vertical position with free ends 96 and 98 in slots 48 of support arms 34 and 36 to serve as a back rest as is shown in FIGURES 3 and 8.

With special reference to FIGURES 2, 4 and 8 the pivoting mechanism of the armrest functions as follows: when armrest 24 is rotated to either an up or down position, it pivots about the axis of hollow pivot screws 42 and 44 in holes 38 and 40 of the support arms 34 and 36. The upper edge of the support arms 34 and 36 are so designed that the inner rounded shoulders 47 provided between semicircular notches 46 and 48 are low enough to allow the respective ends 96 and 98 of the flexible, resilient tension bar 94 to deflect upwardly in elongated roles 90 and 74 of bracket 78 and armrest side walls 54 respectively to thereby permit movement of the armrest from horizontal position as shown in FIGURES 1, 2 and 4 to a vertical position as shown in FIGURES 3 and 8 or vice versa. The outer shoulders on support arms 34 and 36 beyond notches 46 and 48 are high enough to serve as stops and prevent further movement in either direction. The elongated holes 90 and 74 of bracket 78 and armrest 24 (FIGURE 8) guide and direct the deflection of the tension bar 94 so that side or twisting motions are restricted, which greatly improves stabilization of the pivot mechanism. The inherent spring tension of the tension bar 94 holds armrest 24 securely in the selected position.

Attached to the forward flange 84 of bracket 78 is a multiple electrical terminal block 110 containing terminals a, b, c, d, e and f through which connections are made via the insulated lead wires 112 to the automobile's power supply, antenna and speaker as shown in FIGURE 9. Lead-in wires 112 are directed through the hollow hinge pins or pivot screws 42 and 44 upon which armrest 24 pivots as described above.

Portable radio 52 of the present invention is shown in FIGURES 1, 1a and 3 and has a housing that is preferably of a substantially rectangular and flat shape and of such size as to snugly fit into armrest 24. Radio 52 preferably consists of a cover 114 of plastic or other material enclosing a radio receiver chassis 116. Provisions are made on the sides of radio cover 114 to accommodate mounting of tuning knobs 68 and 128 and for pull out handle 118, which is shown in FIGURE 3 at its extended position by dotted lines 118a. A station dial 120 may be placed at both sides of the handle side of the radio 52 which extends outside the armrest 24 as seen in FIGURES 1 and 3 and oriented to be easily read in either down or up position of the armrest or by either occupant of the seat, and when in the up position by occupants of the rear seat. Tuning of the portable radio may be accomplished by a group of push buttons of which only three, 200, 202 and 204, are shown to simplify the drawings, or by tuning knobs 68. A loudspeaker 132 internally of the radio transmits the sound upwardly or rearwardly through apertured section 124 of radio cover 114 when the radio is removed from armrest 24.

With reference now to FIGURES 3 and 9, there is shown in FIGURES 9 a schematic electrical diagram which shows a suitable transistor type superheterodyne receiver circuit including an off-on switch 128 ganged to the volume control potentiometer 130, a speaker 132 coupled to a push-pull amplifier 131, loop-stick antenna 136, and power supply 138 which may be a 9V mercury or similar type of battery. This generally conventional radio circuit is modified by adding a double-pole, double-throw switch 140 which is attached to the rear of the radio chassis 116 (see FIGURE 3) and is operated by a spring loaded plunger 142 which is a part of switch 140 and partially extends outside of radio housing cover 114 in such manner that when the radio 52 is inserted into armrest 24, plunger 142 is depressed by abutting against a portion of central flange 84 on bracket 78. Depression of plunger 142 results in automatic cut-off of the internal radio speaker 132 and power supply 138. Removing portable radio 52 from its receptacle returns plunger 142 of switch 140 to its alternate free position thereby connecting the internal radio speaker 132 and its own power supply 138.

The double-pole, double-throw switch 140 is composed of a common pole 139 connected to the off-on switch 128 and another common pole 141 connected to the secondary of the output transformer 133 of push-pull amplifier 131. When the automatic switch 140 is in its free position as shown in FIGURE 9, i.e., when portable radio 52 is not inserted in automobile armrest 24, a circuit connection is made from common pole 139 to the 9V mercury battery 138 of the portable unit and from common pole 141 to speaker 132 of the portable unit.

A multiple terminal socket 144 is attached to the rear of the radio chassis 116 (FIGURE 3) adjacent the switch 140 in a position so as to mate with multiple terminal plug 110 which is secured to central flange 84 of bracket 78 to establish wire connections between lead-in wires 112 from the fixed automobile unit composed of speaker 122, external antenna 146, and automobile battery 148. By inserting the portable radio 52 in armrest 24, socket terminals a, b, c, d, e, f of the socket 144 attached to the rear of radio chassis 116 electrically connect with corresponding socket terminals a, b, c, d, e, f of the plug terminal 110 secured to bracket 78. With the depression of plunger 142 to transfer contacts 139 and 141 of switch 144, connections are then made from common pole 139 to automobile battery 148 via contacts a of socket 144 and plug 110; from common pole 141 to speaker 122 in the automobile via contacts d on socket 144 and plug 110; and from speaker 122 via contacts c on socket 144 and terminal 110 to the secondary of the output transformer 133 through lead 135.

The external antenna 146 of the automobile is connected to terminal e of plug 110 through the usual shielded cable 150 having an outer sheath, which is grounded to the automobile, connected to terminal b of plug 110 and to ground for the portable radio through terminal b of socket 144. An additional terminal on plug 110 and socket 144 (not shown) may be used to provide a common ground connection for the radio and the automobile if desired to assure adequate grounding of the radio to the automobile seat and chassis. The automobile external antenna 146 is inductively coupled to loop-stick antenna 136 of portable radio 52 in such way as to effectively prevent any de-tuning which may otherwise occur on alternate operations. A shielded lead 151 connects terminal e of socket 144 with the antenna inductive coupling 152 which consists of a few turns of insulated wire wound around the windings of the loop-stick antenna 136.

When portable radio 52 is inserted in the armrest, cover 114 of the radio slides on the inner surface of bottom 60 of armrest 24 so that the holes in multiple terminal socket 144 of the radio are in vertical alignment with the corresponding prongs on terminal plug 110 secured to flange 84 of bracket 78. Lateral positioning of portable radio 52 is effected by side guide resilient strips 107 which are suitably secured to side wall stampings 154 as best shown in FIGURES 3 and 4. Near the rear of the interior of armrest 24, similar resilient strips 108 which are attached at one end to flange 84 on bracket 78 are provided to be placed under tension by bosses 115 on the rear side of portable radio 52 when the radio is inserted. The action of strips 108 serves to ease the release upon removal of radio 52 from armrest 24.

FIGURE 5 shows a slightly modified plug-in arrangement to connect the portable radio 52 with the automobile electrical system which includes a novel locking mechanism to prevent unauthorized removal of the portable radio from the armrest. In this embodiment multiple terminal block 156 is shown attached to the forward flange 84 of bracket 78 and has a plurality of contact arms 158 and 160 extending laterally therefrom towards the sides to be generally parallel with the rear surface of housing 114 of portable radio 52 and which are adapted to contact the respective radio socket terminals 144a, b, c, etc. of the portable radio 52 to establish connection to the automobile speaker 122, battery 148, and external antenna 146 in the same manner as explained above when the portable radio 52 is inserted into the automobile center armrest 24. Upon insertion of the portable radio 52 into armrest 24, contact arms 158 and 160 are placed under tension to assure good electrical contact and to aid in pushing the radio 52 free upon release thereof. The embodiment of FIGURE 5 may have a switch (not shown) similar to switch 140 to automatically connect or disconnect the internal speaker and power supply of the portable radio 52.

Figure 7:
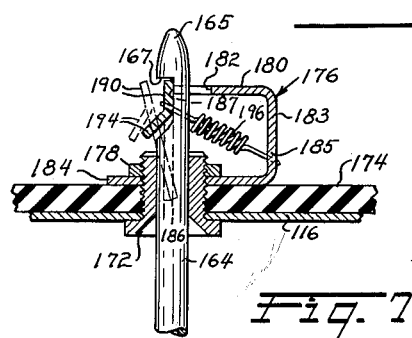
FIGURE 7 is an enlarged plan view along lines 7—7 of FIGURE 6 of the lock mechanism.
Figure 6:
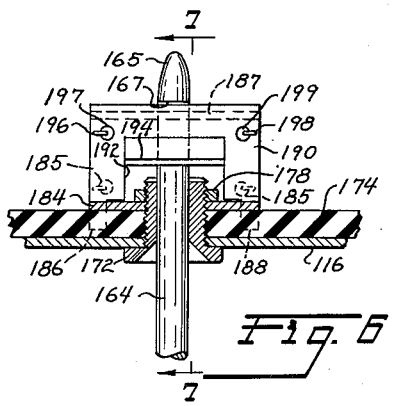
FIGURE 6 is an enlarged side view along lines 6—6 of FIGURE 5 showing a cross section through the components of the lock mechanism.

With reference to FIGURES 5, 6 and 7 in which the same parts are designated by same numerals, a locking mechanism to lock portable radio 52 in the receptacle of center armrest 24 of the automobile comprises an inwardly extending lock bar or plunger 164 which at its rearward end is fastened to a key operated lock 166 that is secured to rear wall 49 of armrest 24. A central part 168 of the key lock 166 to which the plunger 164 is secured, is mounted for rotational or turning movement through means of key 170. The lock mechanism per se of the locking device is located on the rear end wall inside radio 52 and consists of a hollow externally threaded bolt 172 extending from the outside of the radio housing through a hole in the rear of radio chassis 116 and insulation pad 174 holding a U-shaped bracket 176 inside chasis 116 as by means of nut 178 threaded to bolt 172. The upper leg 180 of U bracket 176 is shorter and spared out at the center as at 182 to allow the plunger 164 to pass. The lower leg 184 of U bracket 176 is provided at both its longitudinal edges with slots which receive the tongues 186 and 188 of a striker plate 190 that extends across the entire width of the open end of U bracket 176 and normally abuts with its upper rear surface against the outer edge 187 of the upper leg 180. Two transverse tension springs 196 and 198 are secured at one end to apertures 197 and 199 in striker plate 190 and to apertures 185 in near side 183 of U bracket 176 at their other end to resiliently hold striker plate 190 in its illustrated position.

Striker plate 190 comprises a generally flat plate having a cut-away midsection 192, a part 194 of which is struck outwardly to provide an abutment surface for plunger 164. Plunger 164 has a conically shaped upper free end 165 and is furthermore provided with a notched recess 167 at the outwardly directed side from bracket 176.

The lock mechanism functions as follows: by inserting the radio 52 into armrest 24, plunger 164 which is a part of the receptacle, enters the hollow bolt 172 which is secured to the radio chassis 116 and extends therethrough into the radio chassis to deflect the striker plate 190 as shown by dotted lines at 190 in FIGURE 7. Striker plate 190 pivots about an axis at the ends of tongues 186 and 188 in the slots of the rear wall of radio chassis 116. The conical end section 165 of the plunger 164 moves along the outwardly struck flange 194 of striker plate 190 to deflect the latter outwardly against the bias force of the tension springs 196 and 198 until the striker plate is free to snap into notched recess 167 behind nose end section 165 of plunger 164 to securely hold the plunger within the radio and to thereby lock the portable radio 52 in armrest 24.

To unlock the mechanism and permit portable radio 52 to be removed, it is only necessary to insert and turn key 170 in the key slot provided at the rear end of armrest 24. Rotation of key 170 in either direction causes plunger 164 to rotate and turn notched recess 167 away from and raise striker plate 190 thereby releasing striker plate from surface 167 so that the radio can be removed from armrest 24. By providing sufficient resilient force in contact arms 158 and 160, radio 52 can be made to release itself from its in-the-car operating position by the key turning action to thereby free the radio for easy removal from armrest 24.

A push-button tuning unit comprises a plurality of switches operable by push buttons 200, 202 and 204 and made an integral part of the radio circuit, as shown in the schematic diagram of FIGURE 9. It is clear, however, that any number of push buttons may be incorporated. The first or left-hand push button 200 operates a double pole-double throw switch 206. One common pole 208 is connected to the secondary winding of the antenna transformer 152, and the other common pole 210 is connected to the oscillator tank circuit 212 of the receiver. Second push button 202 operates likewise a double pole-double throw switch 214 which is connected to antenna transformer 152 through pole 216 and to the oscillator tank circuit through pole 218 of the switch contacts associated with push button 200 when the latter switch is "unselected." Third push button 204 operates double pole-double throw switch 220. Any additional push buttons may, of course, be arranged in the same manner.

A pair of pre-tuned variable condensers 222 is connected to the switch poles of each of switches 206, 214 and 220 of push buttons 200, 202 and 204 respectively, switching in a pre-selected station by depressing the respective push button. In the embodiment illustrated, a pair of ganged main tuning condensers 230 is interconnected with the tuning unit as means for manual tuning and rendered operable in a conventional manner when none of station selecting push buttons 200, 202 and 204 or any desired number of buttons thereafter is in a selected position. As an alternative arrangement, other conventional push-button type automobile radios may be used. For example, the push buttons may be used to provide an automatic means for selecting predetermined stations by mechanically moving tuning condensers 230 and potentiometer 232 in which case the voltage output from potentiometer 232 would at all times be proportional to the frequency of the station to which the radio receiver is tuned.

This radio, when installed in an automobile, can be operated either by a passenger or by the driver. But there is a possible hazard when the driver of the vehicle operates the radio while driving, because to do so, he has to turn his head and thus remove his vision from the road to observe the indicator scale on the radio for station tuning. To eliminate this hazard the present invention provides an additional station indicator interconnected with the manual tuning circuit and/or the push buttons which is remote from the receiver and preferably installed in the instrument panel of the vehicle in front of the driver so that it can be observed with the least amount of distraction of the driver's vision from the road.

Potentiometer 232 having a movable contact arm 234 which is geared or otherwise mechanically connected to the main tuning condensers 230 of the tuning circuit units so as to cause concomitant movement therewith, is connected through lead 236 and terminal $a$ of socket 144 and plug 110 to the automobile battery 148. It will be be noted that by this connection, potentiometer 232 does not draw current from battery 138 in portable radio 52. This circuit connection in combination with potentiometer 232 provides means for producing a voltage, the magnitude of which is used to indicate the station to which the radio is tuned. Movable tap 234 of potentiometer 232 is connected to voltmeter 236 through lead 238, contacts $f$ of plug 110 and socket 144. Thus a voltage varying in magnitude is applied to the voltmeter 236 according to the relative position of the main tuning condensers 230 and potentiometer 232, which is indicated on a scale of the voltmeter calibrated in kilocycles and covering the broadcast band. Voltmeter 236 may be conveniently positioned in the automobile instrument panel so as to cause the least distraction for the driver.

Thus, the present invention provides a portable radio which can be effectively used in an automobile or apart therefrom as a self-contained unit without sacrificing or compromising any desirable features of either. It also provides for a convenient and highly shock-proof location of the portable radio when utilized as an automobile radio by inserting the radio in the center armrest of either front or rear seat where it is operable when the center armrest is down or turned upwardly to serve as a back rest. The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description.

What is claimed and desired to be secured by United States Letters Patent is:

1. In combination with an armrest for a vehicle passenger seat of the type which is mounted for pivotal movement to a seat frame; said armrest comprising a hollow receptacle with an open end and an electrical terminal means mounted at the rear of said receptacle remote from and facing said open end; a combination automobile and portable radio receiver comprising a housing having means for tuning the radio at one end thereof; electrical terminal means on the end of the radio housing remote from said tuning means; guide means on side walls of said receptacle for cooperating with side housing walls on said radio for positioning the electrical terminal means on said radio in operative relationship with the electrical terminal means in said armrest receptacle; resilient means mounted in said armrest receptacle adapted to abut against the rear end wall of said radio receiver housing; and snap lock means on the rear side of said receptacle and said radio housing for retaining said radio in a position whereby said resilient means is deflected and releasable from the rear side of said armrest receptacle to assist removal of the radio from the armrest.

2. The combination as defined in claim 1 wherein said snap lock means comprises a striker plate inside said radio housing, there being an aperture in said radio housing wall in alignment with said striker plate and rod means mounted in said armrest receptacle having a notched free end adapted to engage said striker plate to lock said radio in said armrest.

3. The combination as defined in claim 1 wherein said resilient means comprise strips of resilient material rigidly supported at the central rear portion of said receptacle with end portions extending along the rear wall toward side walls of the radio housing and deflecting rearwardly when the radio is positioned in the armrest.

4. The combination as defined in claim 3 wherein the end portions of said resilient strips contain electrical contacts and the rear surface of the radio housing contains electrical contacts located to be in electrical connecting engagement when the radio is locked in its operating position in the armrest receptacle.

References Cited in the file of this patent

UNITED STATES PATENTS

| | | |
|---|---|---|
| 2,071,398 | Frantz et al. | Feb. 23, 1937 |
| 2,133,151 | Rittenhouse | Oct. 11, 1938 |
| 2,280,465 | Barrett | Apr. 21, 1942 |
| 2,710,049 | Potocnik | June 7, 1955 |
| 2,866,891 | Princ | Dec. 30, 1958 |

OTHER REFERENCES

Article (1), article written by Powell in Wireless World, January 19, 1934, page 41, column 2.

Article (2), article written by Ricketts in Wireless World, January 26, 1934, page 59, column 1.